Oct. 1, 1968   L. F. BARTOLETTI   3,403,468
REMOVABLE FISHING ROD GUIDE
Filed May 16, 1966
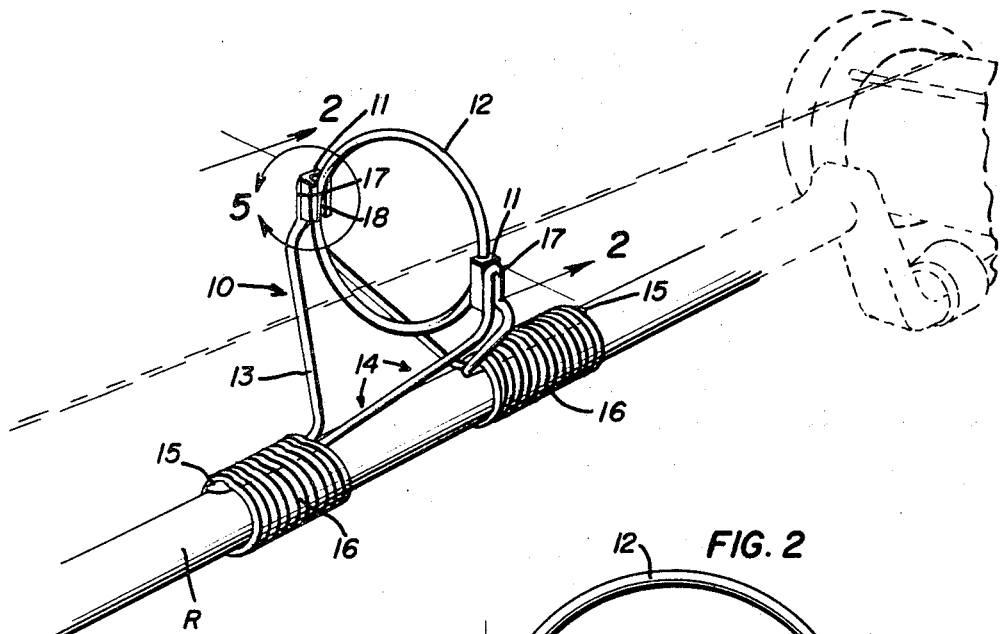
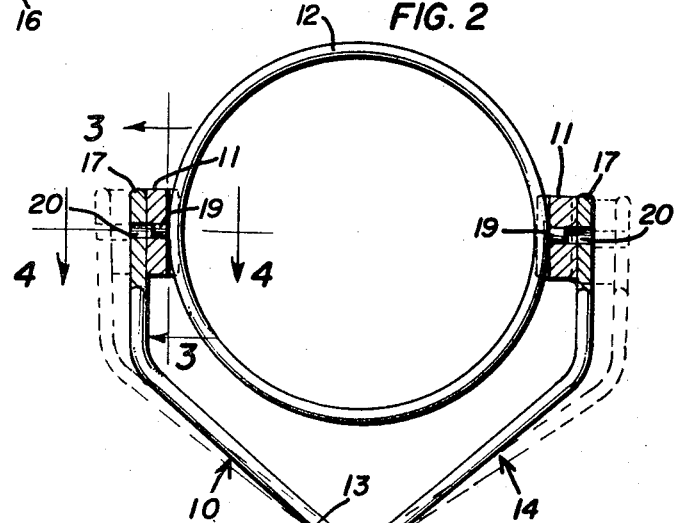
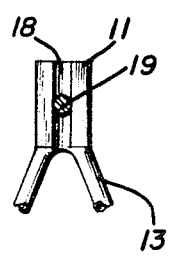
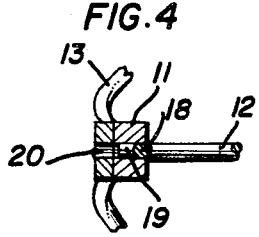
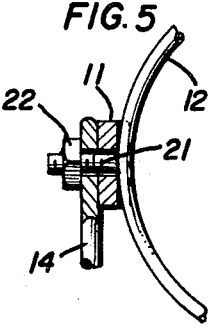
INVENTOR
*Louis F. Bartoletti*

_United States Patent Office_

3,403,468
Patented Oct. 1, 1968

3,403,468
REMOVABLE FISHING ROD GUIDE
Louis F. Bartoletti, 343 101st St., Brooklyn, N.Y. 11209
Filed May 16, 1966, Ser. No. 550,457
3 Claims. (Cl. 43—24)

ABSTRACT OF THE DISCLOSURE

A fishing rod line guide made up of two parts, one of which is a substantially circular guide ring and the other part is a holder for said guide ring which permits the ring to be readily placed in the holder or removed therefrom. The holder is made up of a wire and has two spaced blocks attached thereto in a position to support the guide ring and is secured to the rod by wrappings of cord or the like.

---

This invention relates to that piece of fishing tackle known as a fishing rod guide, and more particularly, to a guide that can be removed easily from the fishing rod.

While most fishing rod guides are fixed to the fishing rod, there are times when it is desirable to remove the guide in a minimum of time and without having to resort to the use of tools in order to separate the guide from the fishing rod.

This latest invention is an improvement on my invention, Fishing Rod Guide, for which an application was made for United States patent on April 19, 1965, and for which I was given Serial Number 449,014 by the United States Patent Office and which has issued as Patent No. 3,354,574, on November 28, 1967. The improvement of this latest invention of mine over that of my previous invention just noted, lies in the fact that this present fishing rod guide can be removed from the rod without the use of any tools whatsoever, as will hereinafter be described.

It is the principal object of this invention to provide a removable fishing rod guide that can be snapped instantly from its holder which is permanently secured to the fishing rod.

Another object of this invention is to provide a removable fishing rod guide that consists of just two members: the holder that is secured to a fishing rod by either a wrapping of cord, wire, or its equivalent; and a guide that is in the form of a ring having structure that secures the ring to the aforesaid holder until one is ready to remove the guide by a hereinafter described snapping action of the hand.

Still another object of this invention is to provide a removable fishing rod guide of the character described that does not require the use of any screws to secure the same to a fishing rod.

Other and further objects of this invention will come to mind on the reading of the specification and on examination of the appended drawing.

In the drawing:

FIG. 1 is a pictorial view of this invention secured to a fishing rod, shown in part in phantom lines.

FIG. 2 is a sectional view of this invention, taken substantially along line 2—2 of FIGURE 1, and viewed in the direction indicated by the arrows.

FIG. 3 is a sectional view of this invention, taken substantially along line 3—3 of FIGURE 2, and viewed in the direction indicated by the arrows.

FIG. 4 is a sectional view of this invention, taken substantially along line 4—4 of FIGURE 2, and viewed in the direction indicated by the arrows.

FIG. 5 is a sectional view of that part of this invention enclosed within the arrowed circle on FIGURE 1, and indicated by the numeral 5, showing an alternate means of securing the guide to the holder.

Referring now to the appended drawing, and particularly to FIGURES 1 and 2, it will be seen that this novel invention of mine consists of a holder 10 that is made of of only three parts: two guide support blocks 11, one of which is located on each side of the guide ring 12 which they support; and the wire 13, which is formed into two V-shaped uprights 14. Each of these is located on either side of the guide ring 12, and each has its apex terminating on top of the fishing rod R in the form of a holding member 15. This holding member 15 is secured to the fishing rod R by means of a wrapping of cord or wire 16 that encompasses both the fishing rod and the member 15 of this invention.

It will be noted on close examination of FIGURE 1 that the single piece of wire that forms the two opposed V-shaped uprights 14 is bent double at 17 on each uppermost outside surface of the two previously mentioned guide support blocks 11 to which the wire is suitably brazed, soldered, or otherwise secured. Each of the guide support blocks 11 is rectangular in shape and is provided with a centrally located and vertically disposed recess 18 (FIGURE 3) in which normally rests a portion of the guide ring 12. This guide ring 12 is provided with a horizontally disposed cantilever stub shaft 19 on each side thereof which rests in part of the horizontally disposed and centrally located opening 20 in each of the two guide support blocks 11, as one can see by examining FIGURES 2 and 4 of the drawing.

It is now obvious from the above described construction of this invention, and from examination of FIGURE 2 of the drawing, that the guide ring 12 is held in place between the two V-shaped uprights 14 by the two stub shafts 19 and also because the previously mentioned wire, from which the uprights are formed, can be sprung by one's hand. This is possible because the normal distance between the inside surface of the two guide support blocks 11 is slightly less than that of the outside diameter of the guide ring 12 when the invention is assembled, thereby requiring one to exert a slight hand pressure in either pulling the blocks 11 apart, or in pulling upward on the guide ring 12. The spring movement of the uprights 14 and the blocks 11 secured thereto is clearly shown in dash lines in FIGURE 2.

One's attention is now directed to FIGURE 5 of the drawing where an alternate method of securing the guide ring 12 in the guide support blocks 11 is by replacing the stub shafts 19 on the guide ring 12 with threaded members 21 on the outer end of which is screwed a nut 22 when the guide ring 12 is assembled in the holder 10 of this invention.

What I now claim as new is:

1. A removable fishing rod guide comprising a wire holder formed from a single piece of wire, the holder having the configuration of two spaced V-shaped uprights with portions to be secured to a rod by means of wrappings of cord or the like, two spaced blocks secured to the upper portions of said uprights, a guide ring, each of the said two spaced blocks being rectangular in form, and each block is provided with a centrally located and vertically disposed recess in the inside surface thereof in which normally rests a portion of the outer surface of the said guide ring.

2. The invention of claim 1, wherein the said guide ring is provided with a horizontally disposed cantilever stub shaft projecting outward from the center of each side of the said ring and resting in a horizontally disposed and centrally located opening in the block that supports that side of the said guide ring.

3. The invention of claim 2, wherein each of the said blocks is secured to the said V-shaped uprights by means of brazing or solder or the like.

References Cited

UNITED STATES PATENTS

| | | | |
|---|---|---|---|
| 2,360,802 | 10/1944 | Stenz | 43—24 |
| 2,778,141 | 1/1957 | Haas | 43—24 |
| 3,058,254 | 10/1962 | Gorham | 43—24 |

FOREIGN PATENTS

| | | |
|---|---|---|
| 966,663 | 3/1950 | France. |
| 371,581 | 4/1932 | Great Britain. |

SAMUEL KOREN, *Primary Examiner.*

DANIEL J. LEACH, *Assistant Examiner.*